9545X
N. Chapin
Double-Acting Pump.
Patented Mar. 30, 1836
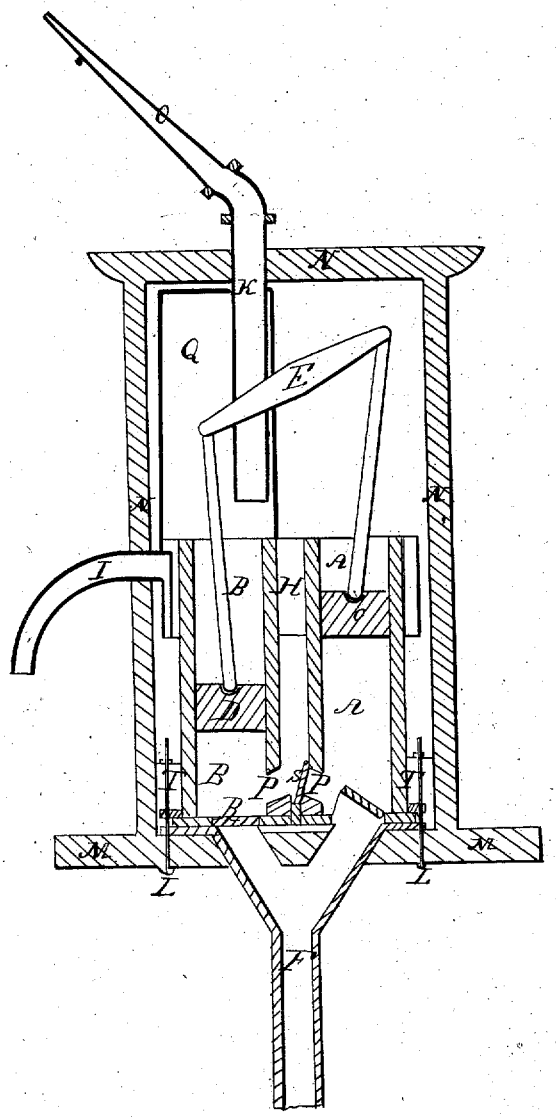
N. PETERS, PHOTO-LITHOGRAPHER, WASHINGTON, D. C.

Mar. 30. 1836 | 107
9545X

Nathan Chapin, of Pen-yan State of New York.

Letters Patent.

The schedule referred to in these Letters Patent and making
part of the same, containing a description in the words of
the said Nathan Chapin himself of his improvement in the
forcing pump.

To all to whom these presents shall come.
Be it known that I Nathan Chapin of Penn Yan in the Coun-
-ty of Yates and State of New York, have invented a new and
useful improvement in the manufacturing and use of forcing
pumps, for drawing water, for the purpose of a fire engine
and for domestic uses, and that the following is a full and
exact description of the construction and operation of the said
machine as invented or improved by me, The figure exhibits
a view of the improvement of the double forcing pump designed
for the purpose of a fire engine and for domestic uses and [illegible]
[illegible] perpendicularly so as to present a section. The figure
represents the barrels A and B with the pistons C and D in
them, which are moved by the lever E directly above whose
fulcrum is at E and they are both in motion at the same
time, C upward and D downward, and by the tendency to
form a vacuum beneath the ascending piston the water is
drawn in through the suction pipe F. and opens the valve R, to
supply the vacancy in the barrel A. formed by the ascension of
its piston C, By this single motion of the pump it may be
seen that the pressure of the descending piston D, has closed
the valve R, in the bottom of the barrel B, to prevent the
return of the water whence it came and opened the valve S. which
[illegible] in an aperture in the form of a V. between the barrels
serving to close each of their discharging orifices P.P. one at a time, it being necessary to close upon one at the instant it rises
from the other to prevent a current between the barrels and giving
the depressed water escape upwards through the connection pipe G
into the receiver H which surrounds the tops of both barrels, &
serves to regulate the current of water by the admittance and
escape of air through the forcing pipe K, as it is discharged
through the syphon I. — This irregularity would be produced
by discharging the barrels one at a time. Q represents an air
vessel which is connected with the receiver H, and is only used
when the syphon I. is stopped for the purpose of raising water
through the pipe K, into an upper room, or by the addition of
the direction pipe, O. for the fire engine use. This acts upon
the water when passing through the pipe K and keeps it in
regular and uniform motion, &c. The Machine is fastened upon
its base M, by means of the bolts L, L, passing through an
iron collar T. T. which surrounds the bottoms of the barrels
which rests upon a flange at the division of the barrels from
their base. N. N. represents the case which encloses
the machinery and is fastened to the base by screws.
The use and principle of working it is believed is sufficiently
explained in the foregoing description, and it may be appli-
ed, while handed, for drawing water from a well or cistern,
or liquid from any vessel, and by stopping tightly the syphon
I may answer to draw water into an upper room or as a fire
engine by means of the direction pipe O. It is cheap, com-
pact and simple, and so constructed that any person of or-
dinary understanding may take it apart and repair it, or
make alterations if required, without applying to a profess.
mechanist. The invention and improvement in the do-
uble forcing pump, now in use, for which a patent is claimed
consists in. The invention of the valve R, which has a double
operation in serving to stop the orifices P.P. one at a time.
Thus when the piston D, in the barrel B is descending, it stops the orifice P in the barrel A. and vice versa, in the pump
in common use two valves are required to stop the orifices 2,
In fitting the valve R. R, without nailing, being a part of
the leather in the division, and in putting the pump together
with bolts and fastening it down with an Iron collar so that
any one may take it apart and put it together again with
ease in the old pump it was all fastened together so that it
required a maker of pumps to take it apart, repair it and put
it together again. 3. In surrounding the tops of the barrels
A. B with the reservoir H, In the old pump in use the
reservoir was placed between the bottoms of the barrels and always
left water stand so that it was never dry, but always wet &
uncomfortable, By this improvement the reservoir is always
emptied when the requisite quantity of water has been drawn
4. In constructing the case N. N. so that it may be taken
off whole by any one for the purpose of repairing or cleaning
the pump machinery. 5. The suction pipe F being divided
like a V so as to supply through a different orifice either barrel
and thus differing from the old pump which had but one orifice
to supply both barrels 6. In adding the connecting pipe G which
comes to a point at the base. In the former pump the two barrels
were placed some distance apart and had no pipe like G. This is
so constructed as to join onto both barrels, and may be cast
at the same time. 7. An improvement in adapting an old princi-
-ple to a new purpose, The principle of the forcing pipe K, and
direction pipe O, acting as an engine spout by means of the
machinery of a forcing pump, is not claimed to be an invention
but an improvement in applying that principle to a pump for
domestic purposes which it is believed has never before been
done, Also in adding to the pump the air vessel Q, which
regulates the stream or jet of water and makes it while the
reservoir is supplied steady and constant. The double
forcing pump in common use has neither the pipes K.

112. 9545X or O. nor the air vessel G. but is employed to the purpose of drawing water through a syphon like I. The Engine pump may be made on a small scale and from the nature of its construction of the most durable materials and will occupy a very small place in a kitchen.

In testimony that the within is a true specification of my said improvement as within described I have hereunto set my hand the [illegible] day of March in the year of our Lord One thousand eight hundred and thirty six Witnesses Henry A. Wisner }
John L. Lewis Junr. }

Nathan Chapin

[illegible] (Drawing in Portfolio) [1320 words